Nov. 16, 1954

W. W. LOWTHER 2,694,465

WET-TYPE AIR CLEANER

Filed Jan. 27, 1951

Inventor
Wilfred W. Lowther
By his Attorneys
Merchant & Merchant

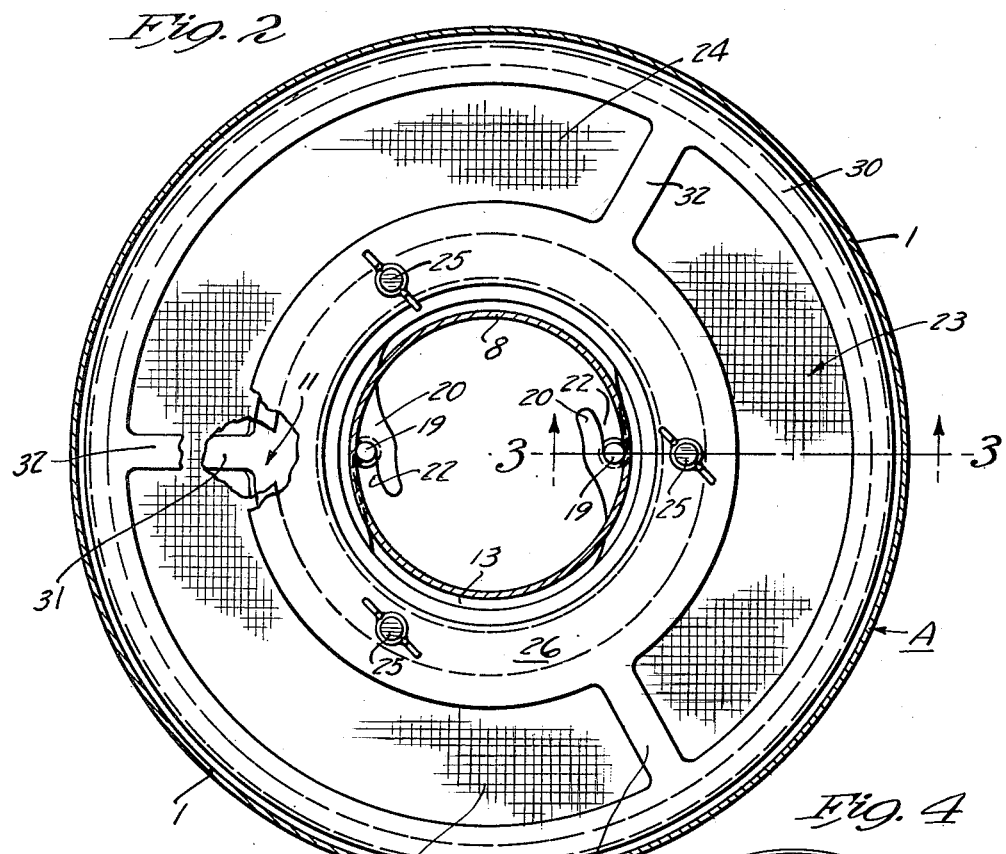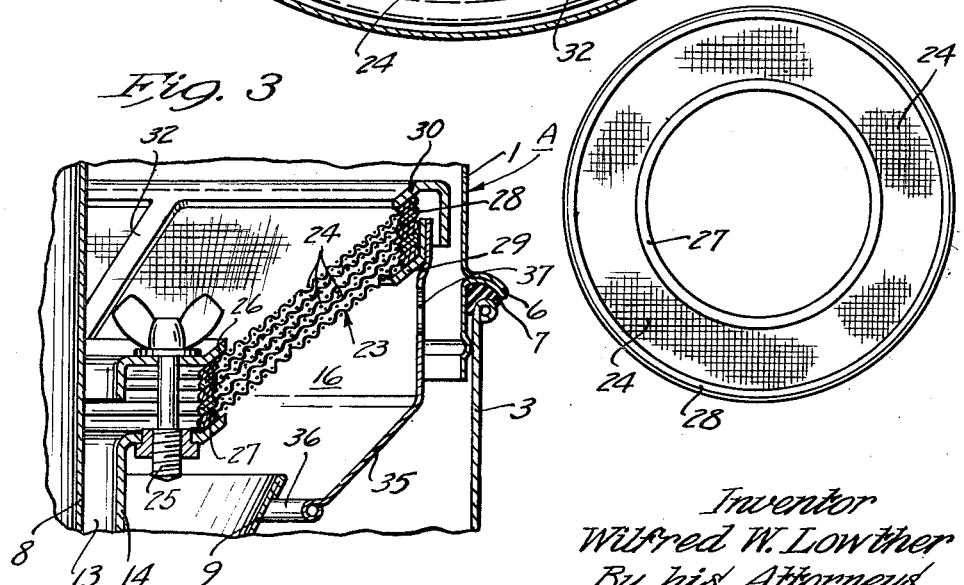

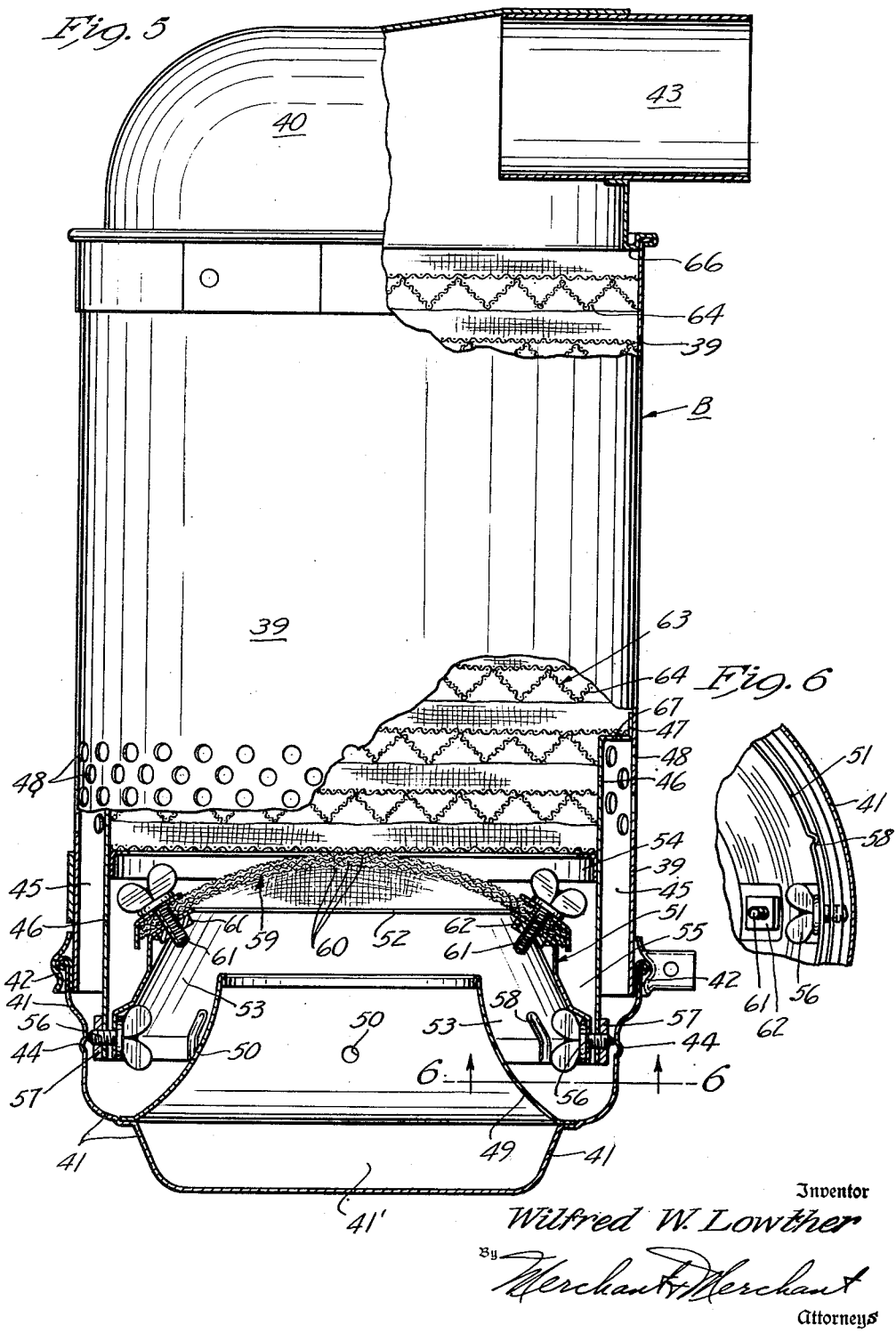

United States Patent Office 2,694,465
Patented Nov. 16, 1954

2,694,465

WET-TYPE AIR CLEANER

Wilfred W. Lowther, St. Paul, Minn., assignor to Donaldson Company, Inc., St. Paul, Minn., a corporation of Delaware Application January 27, 1951, Serial No. 208,127

14 Claims. (Cl. 183—15)

My present invention relates to air cleaners for use in connection with internal combustion engines, compressors and other air-consuming devices, and more particularly to air cleaners of the kind employing a body of free-flowing liquid, and which are often referred to as "wet-type" air cleaners or as "oil-washed" air cleaners.

In a still more specific sense, the instant invention relates to improvements in wet-type air cleaners of the general character disclosed and claimed in the Lowther Patent No. 2,387,278 of October 23, 1945.

Among the important objects of the instant invention is the provision of structural improvements of the air cleaners of the general character described in said Lowther Patent No. 2,387,278, whereby to facilitate and simplify the assembly, disassembly and servicing thereof.

Another object of the instant invention is the provision, in an air cleaner of the kind described, of improved structure and means for detachably and removably securing the baffle and filter structure in the lower portion of the cleaner, whereby to achieve maximum rigidity of structure.

A still further important object of the invention is the provision of improvements in air cleaners of the kind described whereby the liquid reservoir-forming bottom of the cleaner casing may be removed, cleaned and replenished with liquid without removing the annular baffle structure adjacent the bottom of the cleaner and the associated filter, and wherein the said annular baffle structure and associated filter (the latter preferably comprising superposed screens) may be removed, as a unit, when desired, through the open bottom of the cleaner and may thereafter be disassembled for cleaning.

The above and highly important objects and advantages of the invention will be made apparent from the following specification, claims and appended drawings.

In the accompanying drawings, like characters indicate like parts throughout the several views.

Referring to the drawings:

Fig. 2 is an enlarged transverse sectional view taken on the line 2—2 of Fig. 1, with some parts broken away;

Fig. 3 is an enlarged fragmentary sectional view taken on the line 3—3 of Fig. 2;

Fig. 4 is a plan view of the several superposed conical annular screens of the primary filter of the cleaner;

Fig. 5 is a view in side elevation, with some parts broken away and some parts shown in axial section, showing a preferred form of invention incorporated in an air cleaner of the type disclosed in Fig. 2 of the Lowther Patent No. 2,387,278; and Fig. 6 is a fragmentary detail in section, taken substantially on the line 6—6 of Fig. 5.

*Figs. 1 through 4*

Figure 1:
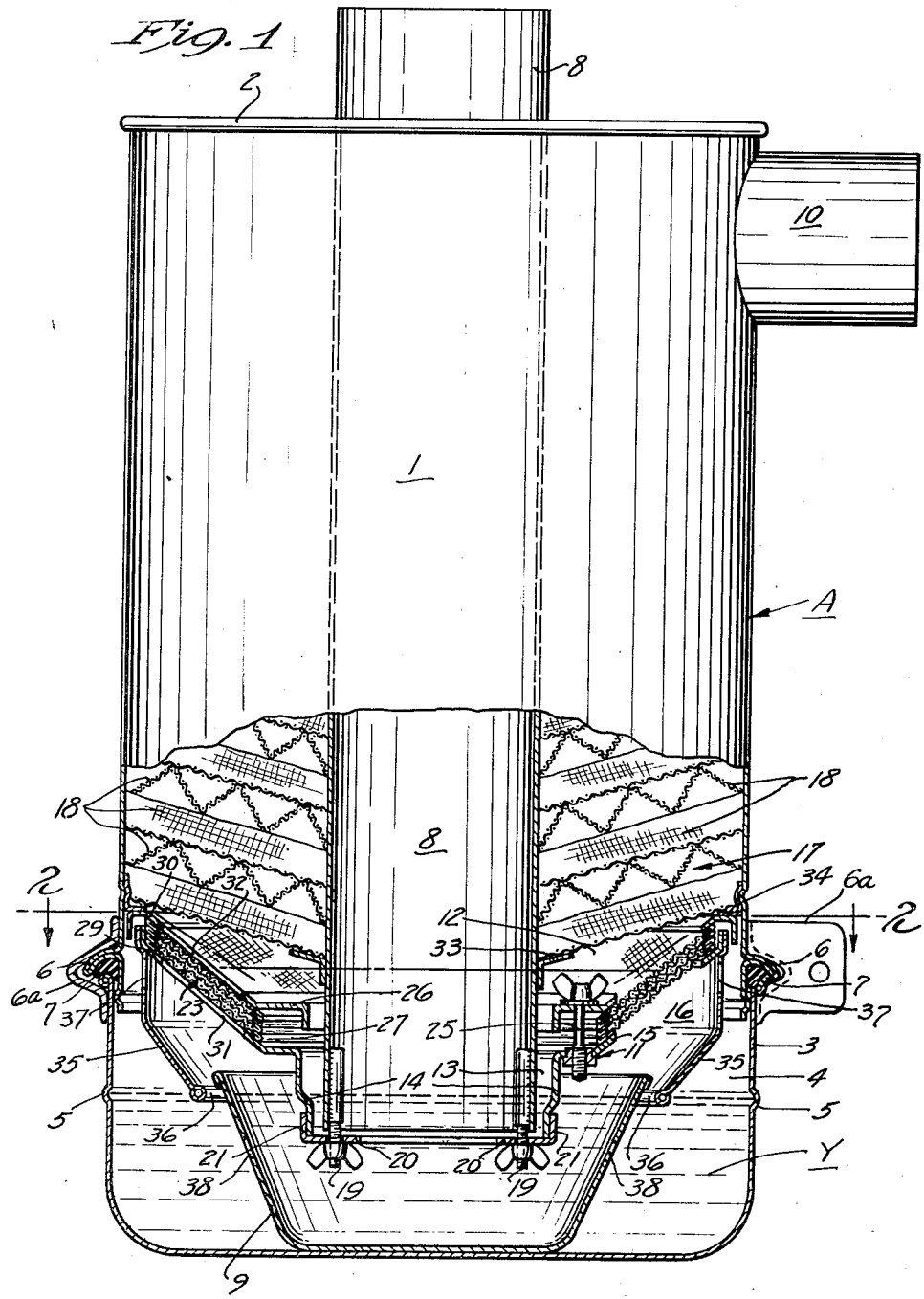
Fig. 1 is a view in side elevation, with some parts broken away and some parts shown in axial section, showing a preferred form of the invention incorporated in a commercial air cleaner of the type disclosed in Fig. 1 of the Lowther Patent No. 2,387,278.

The outer casing of the cleaner illustrated in these Figures 1 through 4 is indicated as an entirety by A and is in the nature of a vertically-disposed generally cylindrical shell section 1 that is closed at its top by a head 2 and at its bottom by a downwardly displaceable cup-like casing section 3 providing a liquid reservoir 4 that normally contains a body of free-flowing liquid, usually engine oil, to a static level of an outpressed bead 5. The cup-like bottom casing section 3 is telescopically applied over the open lower end of cylindrical casing section 1 to the extent allowed by a casing flange 6 and associated sealing gasket 7. Any suitable anchoring means may be employed for detachably securing the cup-like bottom casing section 3 in its operative position shown, but for this purpose, I preferably employ a split clamping band 6a of the variety disclosed and claimed in the Lowther et al. Patent No. 2,273,210 of February 17, 1942.

Leading axially downwardly through the head and interior of the cleaner casing A is a tubular central air intake conduit 8, which has its lower discharge end disposed in the liquid reservoir 4, but spaced above the bottom thereof. In the preferred embodiment of the invention illustrated in these Figures 1 through 4, the discharge end of the central air intake conduit 8 is concentrically disposed in an inner oil cup 9, rigidly secured to the bottom of the cup-like bottom casing section 3 by solder, welding or the like. Leading from the upper portion of the cleaner casing is a clean air outlet passage defined by a conduit section 10, which is adapted to be connected to the intake of an internal combustion engine or other air-consuming device.

Concentrically disposed about the lower or discharge end portion of the air intake conduit 8 is an annular baffle structure, indicated as an entirety by 11, and which defines, together with the air intake conduit 8, a quiescent annular liquid-collecting zone 12 thereabove and a generally annular restricted oil return passage 13 from the quiescent zone 12 to the reservoir 4 at a place adjacent the discharge end of the conduit 8. This baffle structure 11 comprises a tubular portion 14 extending upwardly from a plane adjacent the discharge end of the conduit 8 and formed at its upper end with an outwardly and upwardly directed conical annular flange 15. The outer marginal portion of the baffle flange 15 defines the radially inner marginal portion of a relatively unrestricted air passage 16 leading upwardly from the reservoir 4 to an annular filter-equipped expansion chamber 17 thereabove. The expansion chamber 17 is provided with a secondary filter, which is preferably of the loose-pack variety and which may, for the purpose hereof, be assumed to be composed of superposed annular corrugated woven wire screens 18 of the kind disclosed and claimed in the Schulz Patent No. 2,011,303 of August 13, 1935. This filter, comprising screen elements 18, functions in the structure illustrated, as a secondary filter and may be hereinafter referred to as such.

In accordance with the invention, the generally conical annular baffle structure 15 of Figs. 1 through 4 is displaceably but positively anchored to the discharge end portion of the air intake conduit 8 by releasable anchoring or clamping means comprising wing nut equipped anchoring bolts 19 and slotted anchoring flanges 20. The bolts 19 are circumferentially spaced and are welded or otherwise rigidly secured to the interior of the air intake conduit 8 with their screw-threaded lower ends depending from the bottom of the air intake conduit 8. The anchoring flanges 20 are integrally formed with an annular collar 21, which embraces and is rigidly secured to the discharge end of the tubular portion 14 of baffle structure 11. As will be seen, particularly by reference to Fig. 2, the anchoring flanges 20 extend across the discharge end of the annular liquid return passage 13 and are provided with open-ended arcuate slots 22 for reception of the wing nut equipped anchoring bolts 19. With this structure, displacement of the baffle structure 11 and parts carried thereby through the open lower end of the casing section 1 may be effected by merely loosening the wing nuts of bolts 19 and rotating the baffle structure 11 in a clockwise direction with respect to Fig. 2, sufficiently to disengage the bolts 19 from the arcuate slots 22.

Spanning the annular air passage 16 is an annular and preferably conical primary filter 23, which, preferably, is of the close-pack variety comprising a plurality of superposed woven wire screens individually indicated by 24. The radially inner portion of this composite primary filter element 23 is seated upon the flange 15 of baffle structure 11 and is displaceably but positively secured thereto by releasable anchoring or clamping means comprising circumferentially spaced wing head equipped clamping bolts 25 and an annular clamping ring or element 26, which also may be considered as part of the baffle structure 11.

In the preferred arrangement illustrated in Figs. 1 through 4, the individual screens 24 of the primary filter 23 are provided at their inner marginal edges with metallic reinforcing beads 27 and at their outer marginal edges with similar clamping beads 28. In the arrangement illustrated, the reinforcing beads 27 at the inner marginal edges of the several screens 24 of filter 23 are clamped tightly between the filter seating flange 15 and the filter clamping ring 26.

Preferably, and as illustrated, the filter seating flange 15 of baffle 11 is integrally formed with an outer filter seating ring 29 and the filter clamping flange 26 is similarly integrally formed with an outer clamping ring 30. The outer filter seating ring 29 is connected to the inner filter seating flange 15 of baffle 11 by circumferentially-spaced spoke-like portions 31, which span the annular air intake passage 16. The outer filter clamping ring 30 is connected to the inner filter clamping ring 26 by similar circumferentially-spaced spoke-like elements 32. Of course, the outer screen beads 28 of the filter 23 are securely clamped between the outer seating ring 29 and the outer clamping ring 30.

The secondary loose-pack filter, comprising screens 18, is permanently held in place by inner and outer retaining flanges 33 and 34 respectively, the former being rigidly anchored to intake conduit 8 and the latter to casing section 1. By reference particularly to Fig. 1, it will be seen that the outer clamping ring 30 of the unitary filter 23 and baffle structure 11 is seated against the undersurface of the flange 34, which latter serves as a base of reaction for the unit comprising baffle structure 11 and filter 23 under the clamping action of the wing nut equipped anchoring bolts 19.

In the preferred embodiment of the invention illustrated in Figs. 1 through 4, a skirt-like splash baffle 35 is anchored to and depends from the outer filter seating ring 29. The open lower end of this splash baffle 35 is concentrically disposed about the upper portion of the oil cup 9 to provide therebetween an annular passage 36, and the vertically intermediate portion of said splash baffle 35 is provided with a circumferentially spaced series of pressure equalizing apertures 37. In the preferred embodiment of the invention illustrated in Figs. 1 through 4, the inner oil cup 9 is provided with a series of circumferentially-spaced oil flow passages 38.

Operation (Figs. 1 through 4)

When the final air discharge conduit 10 is operatively connected to the intake system of an internal combustion or other air consuming device, the cleaner will operate substantially as follows: Dust-laden air will enter the cleaner through the central air intake conduit 8 and will be discharged downwardly therefrom into the inner oil cup 9 wherein the air will reverse its direction of travel and pass upwardly through the annular air passage 16 and primary filter 23 into and through the screened expansion chamber 17 to and through the final discharge conduit 10 to the engine. As the air column passes through and reverses its direction within the inner oil cup 9, it will displace most or all of the oil contained therein and will carry the same upwardly therewith through the primary filter 23 and into the annular chamber space thereabove. Due to the conical shape of the primary filter 23, there will be a tendency to direct oil, passing therethrough, upwardly and radially inwardly toward and into the relatively quiescent liquid-collecting zone overlying the baffle structure 11 so that a considerable portion of the oil will be removed from the upwardly moving air stream in the lower portion of the annular expansion chamber 17. The balance of the oil carried with the air moving upwardly through the screened expansion chamber 17 will be intercepted by the screens, collected and drained toward the central air intake tube 8, where it will flow down and collect and build up a head of oil in the said relatively quiescent zone 12 overlying the baffle structure 11, so that only dry oil-free air will normally be discharged through the final discharge conduit 10. The oil thus collected in the quiescent annular oil-collecting zone 12 above the baffle structure 11 will flow downwardly through the annular oil-return passage 13 and be re-delivered to the moving air column adjacent the discharge end of the intake conduit 8, from where it will be recirculated through the upper portions of the cleaner in the manner previously described. Under such operating conditions, air-borne dust particles entering the cleaner will be trapped by the oil and deposited in the bottom of the liquid reservoir, and, of course, the cleaner will require periodical servicing for the purpose of removing the collected dust and other foreign substance and replenishing the oil or other cleaning liquid Y. Under the most usual operating conditions, foreign matter entering the cleaner will be largely or wholly ordinary earthen dust, and so long as these conditions prevail, there will be very little tendency to plug or clog the relatively tight-packed primary filter 23. Hence, under such conditions, the cup-like bottom section 3 of the casing and its integrally inner oil cup 9 is all that need be removed for the purpose of servicing the cleaner. However, under certain conditions, and particularly at certain times of the year, the air entering the cleaner may carry, in addition to the usual earthen dust, an exceptionally high volume of vegetable fibers, which do tend to become lodged in and clog the primary filter 23. However, when the bottom casing section 3 is removed for ordinary servicing, this condition can easily be detected. Of course, when this plugged or semi-plugged condition of the primary filter 23 is detected, complete servicing will then require the removal and cleaning of the unit comprising the baffle structure 11 and primary filter 23. Many times this cleaning of the primary filter 23 can be accomplished upon removal of the said unit through the bottom of the cleaner without removal of the filter 23 from the baffle structure 11. If, however, it is discovered that thorough cleaning of the filter 23 requires removal from the baffle structure 11 of the several screens 24 thereof, this can readily be accomplished by merely removing clamping bolts 25 and clamping ring 26, which will then allow disassembly of filter 23 and individual cleaning of its several screens 24.

Description, Fig. 5

In Fig. 5, the outer casing or shell of the air cleaner, indicated as an entirety by B, comprises a generally cylindrical outer wall or shell section 39, which is vertically disposed and is closed at its upper end by a head 40 and is normally closed at its lower end by a downwardly displaceable cup-like bottom section 41. As shown, this downwardly displaceable bottom section 41 is normally held in position by a split clamping band 42 of the kind disclosed in the Lowther Patent No. 2,273,210 of February 17, 1942. The casing head section 40 is equipped with a laterally-extending air outlet conduit sleeve 43, which is adapted to be connected to the air intake system of an internal combustion engine or other air-consuming device. The displaceable cup-like bottom section 41 of the casing provides a reservoir or sump 41' for cleaning liquid, such as conventional lubricating oil, not shown, to a normal static level indicated by a bead 44. In this form of the invention, the air intake conduit, indicated by 45, is defined by the cylindrical casing wall 39 and by a relatively short concentrically disposed inner cylindrical wall 46. This inner sleeve or cylindrical wall 46 is outwardly expanded at its upper end and anchored fast to the outer wall 39 at 47 to thereby close the upper end of the annular intake passage 45 and rigidly secure the inner wall 46. Atmospheric air is admitted to the downwardly-directed annular air intake passage 45 through vertically and circumferentially-spaced air intake apertures 48 in the shell wall 39. The annular air intake passage 45 extends downwardly to a plane somewhat below the normal static fluid level, indicated by bead 44, in the reservoir 41', and the outside of the lower end portion of the annular passage 45 is defined by the cylindrical upper portion of the displaceable cup-like bottom casing section 41. In the preferred embodiment of the invention illustrated, the downwardly directed annular air intake passage 45 discharges into an annular reservoir space, defined at its inside by an upwardly directed inner oil cup-forming flange 49, which is anchored at its lower end on the lower portion of the displaceable cup-like bottom casing section 41, has its upper end disposed above the plane of the oil level bead 44, and is provided at its intermediate portion with a circumferentially-spaced series of liquid level and metering passages 50.

In this form of the invention, the intake air is downwardly discharged in an annular stream into the lower portion of the liquid reservoir 41', wherein the said annular stream of air reverses its direction of travel and passes upwardly over the inner surface and upper edge of the flange 49. Concentrically disposed within the discharge end portion of the intake passage-forming inner wall 46 is an annular baffle structure indicated as an entirety by 51, which is broadly the equivalent of the annular baffle structure 11 of Figs. 1 to 4 inclusive. This annular baffle wall structure 51 flares generally upwardly and inwardly toward its free upper edge, which defines a central aperture 52. This baffle 51 and the functionally-similar baffle 11 of Figs. 1 to 4 may hereinafter be referred to as centrally apertured baffles. By reference to Fig. 5, it will be seen that the upper portion of flange 49 cooperates with the centrally apertured annular baffle 51 to define an upwardly, directed continuation of the downwardly-directed intake passage 45, which, upwardly-directed continuation, is indicated by 53.

The baffle 51 provides a relatively quiescent annular liquid-collecting zone 54 thereabove and cooperates with the inner surface of cylindrical wall 46 to define a relatively narrow annular liquid return passage 55 leading downwardly from said quiescent collecting zone 54 to the liquid reservoir at a place immediately adjacent the discharge end of intake passage 45. By reference to Fig. 5, it will be seen that the baffle wall structure 51 is detachably but rigidly secured to the discharge end portion of cylindrical wall 46 by releasable anchoring means comprising a circumferentially-spaced series of wing bolts 56, which have threaded engagement with nuts 57 that are welded or otherwise secured to the outside of wall 46. In this structure, uniform spacing of the discharge end portion of baffle wall 51 from the discharge end portion of passage wall 46 is controlled by a circumferentially-spaced series of centering lugs 58 formed by outwardly pressing portions of the baffle wall 51.

Spanning the central aperture of the baffle structure 51 is a primary filter 59, which, in its preferred form illustrated, comprises a superposed plurality of dome-shaped woven wire screen elements 60. This dome-shaped primary filter 59 is seated upon the upper free end portion of baffle 51 and is detachably secured thereto by releasable anchoring means comprising a circumferentially-spaced series of wing bolts 61, which have threaded engagement with nuts 62 welded or otherwise secured to the undersurface of baffle 51. This primary filter 59 is, of course, the broad equivalent of the primary filter 23 of Figs. 1 to 4.

That portion of the interior of the cleaner above the primary filter 59 provides an expansion chamber and is equipped with a secondary filter 63 comprising a superposed plurality of corrugated woven wire screens, individually indicated by 64. The bottom of this secondary filter 63 is seated on the upper end portion 65 of the cylindrical wall 46, and the upper portion thereof is pressed against an annular shoulder 66 afforded by the head section 40 of the casing.

*Operation (Fig. 5)*

The normal operation of the cleaner illustrated in Fig. 5 is substantially identical to the operation of the cleaner disclosed in Fig. 2 of the Lowther Patent No. 2,387,278, and is sufficiently similar to the operation of the cleaner described in connection with Fig. 1 to 4, but further amplification thereof does not appear necessary. Attention is, however, called to the fact that the displaceable reservoir-forming bottom section 41 of the cleaner may be removed for servicing without disturbing the baffle structure 51 or the primary filter 59, and that said baffle structure 51 and primary filter 59 may be readily removed through the bottom of the cleaner as a unit when the bottom casing section 41 has been removed. In many cases, it would be possible to clean the primary filter 59 without removing the same from the baffle structure 51, but when such is not possible or practical, the primary filter may be removed from the baffle structure and the several screens 60 thereof disassembled for independent cleaning.

My invention has been thoroughly tested and found to be completely satisfactory for the accomplishment of the objectives set forth; and while I have shown and described a commercial embodiment of my novel device, it will be understood that the same is capable of considerable modification and that modification may be made without departure from the spirit and scope of the invention as defined in the claims.

What I claim is:

1. In a wet type air cleaner, a generally cylindrical vertically-disposed outer casing having a cup-like displaceable bottom section defining a liquid reservoir, releasable anchoring means securing said cup-like bottom section in operative position, a central air intake conduit leading axially downwardly through the casing with its lower end disposed in but spaced above the bottom of the liquid reservoir, an air outlet passage from the upper portion of the casing, a downwardly displaceable annular baffle structure concentrically spaced about the discharge end portion of the central air intake conduit and defining therewith a quiescent annular liquid-collecting zone thereabove and a downwardly directed liquid return passage from said zone to the reservoir at a place adjacent the discharge end of the intake conduit, the outer marginal edge of said baffle structure defining the inside of an annular air passage from the reservoir to a chamber spaced above the reservoir, an annular filter supported by said baffle structure and spanning said annular air passage, releasable anchoring means detachably but positively securing the said baffle structure to the discharge end portion of the intake conduit, and releasable anchoring means detachably but positively securing said annular filter to said baffle structure, said baffle structure and filter being removable through the bottom of the casing as a unit when the displaceable bottom casing section is removed, and said filter being removable from the baffle structure when the said unit is removed from the casing.

2. The structure defined in claim 1 in which said filter comprises a superposed plurality of annular screens supported by the baffle structure and detachably anchored together and to the baffle structure by the baffle anchoring means.

3. The structure defined in claim 1 in which said baffle structure comprises vertically spaced annular parts detachably secured together by the said filter anchoring means and between which the radially inner portions of the filter is clamped.

4. In a wet type air cleaner, a generally cylindrical vertically-disposed outer casing having a cup-like displaceable bottom section defining a liquid reservoir, releasable anchoring means securing the cup-like bottom section in operative position, a central air intake conduit leading axially downwardly through the casing with its lower end disposed in but spaced above the bottom of the liquid reservoir, an air outlet passage from the upper portion of the casing, a downwardly displaceable annular baffle structure concentrically spaced about the discharge end portion of the central air intake conduit and defining therewith a quiescent annular liquid-collecting zone thereabove and a downwardly directed liquid return passage from said zone to the reservoir at a place adjacent the discharge end of the intake conduit, the outer marginal edge portion of said baffle structure defining the inside of a generally annular air passage from the reservoir to the chamber space above the reservoir, an annular filter spanning said generally annular air passage and having its inner marginal portion seated on said annular baffle structure, a filter supporting ring seating the outer marginal portion of the filter and rigidly connected to the baffle structure by connecting portions spanning said passage, releasable anchoring means detachably but positively securing said baffle structure to the discharge end portion of the intake conduit, and releasable anchoring means detachably but positively securing said filter to said baffle structure, said baffle structure and filter being removable through the bottom of the casing as a unit when the displaceable bottom casing section is removed, and said filter being removable from the baffle structure when said unit is removed from the casing.

5. The structure defined in claim 4 in further combination with a skirt-like annular splash baffle carried by and depending from the said filter-supporting ring.

6. The structure defined in claim 4 in which the filter anchoring means comprises spaced concentric inner and outer retaining rings respectively overlying and seated on the inner and outer marginal portions of the filter and connected by spaced connecting portions spanning said air passage, and a clamping device detachably securing the inner retaining ring to the underlying portion of the baffle structure and placing the inner marginal portion of the filter under clamping pressure.

7. In a wet type air cleaner, a generally cylindrical vertically-disposed outer casing having a cup-like displaceable bottom section defining a liquid reservoir, releasable anchoring means detachably securing the cup-like bottom section in operative position, a central air intake conduit leading axially downwardly through the casing with its lower end disposed in but spaced above the bottom of the liquid reservoir, an air outlet passage from the upper portion of the casing, a downwardly displaceable annular baffle structure concentrically spaced about the discharge end portion of the central air intake conduit and defining therewith a quiescent annular liquid-collecting zone thereabove and a downwardly directed liquid return passage from said zone to the reservoir at a place adjacent the discharge end of the intake conduit, the outer marginal edge portion of said baffle structure defining the inside of a generally annular air passage from the reservoir to the chamber space above the reservoir, an annular filter spanning said generally annular air passage and having its inner marginal portion seated on said annular baffle structure, a filter supporting ring seating the outer marginal portion of the filter and rigidly connected to the baffle structure by connecting portions spanning said passage, a skirt-like annular splash baffle carried by and depending from said filter-supporting ring, releasable anchoring means detachably but positively securing said baffle structure to the discharge end portion of the intake conduit, and releasable anchoring means detachably but positively securing said filter to said baffle structure, said releasable filter anchoring means comprising spaced concentric inner and outer retaining rings respectively overlying and seated on the inner and outer marginal portions of the filter and connected by spaced connecting portions spanning the air passage and a clamping device detachably securing the inner retaining ring to the underlying portion of the baffle structure and placing the inner marginal portion of the filter under clamping pressure, said baffle structure and filter supporting ring and splash baffle and filter retaining rings being removable as a unit through the bottom of the casing when said displaceable bottom casing section is removed, and said filter being removable from the baffle structure when said unit is removed from the casing.

8. The structure defined in claim 4 in which the said filter comprises a superposed plurality of annular screens which are separable for independent cleaning when the filter is removed from the baffle structure.

9. The structure defined in claim 4 in which the filter comprises a superposed plurality of annular screens, and wherein the filter anchoring means comprises spaced concentric inner and outer retaining rings respectively overlying and seated on the inner and outer marginal portions of the filter and connected by spaced connecting portions spanning said air passage, and a clamping device detachably securing the inner retaining ring to the underlying portion of the baffle structure and placing the inner marginal portion of the filter under clamping pressure.

10. The structure defined in claim 9 wherein the filter comprises a superposed plurality of annular screens.

11. In a wet-type air cleaner, spaced generally cylindrical walls defining an outer casing with an air inlet passage leading downwardly into its lower portion and a concentrically-located chamber leading upwardly from the lower portion of the casing, a downwardly displaceable cup-like section for the casing and defining a liquid reservoir in the lower portion of the casing having its bottom spaced below the discharge end of the inlet passage and wherein air passing from the inlet passage to said chamber reverses its direction around the discharge end of the inlet passage, releasable anchoring means securing said displaceable cup-like section in operative position, an air outlet from the upper portion of the casing, a centrally apertured generally annular baffle wall structure disposed concentrically with respect to and adjacent the discharge end of the inlet passage and providing a relatively quiescent liquid-collecting zone thereabove, the lower marginal edge of said baffle wall structure being generally spaced from a marginal edge portion of a wall of said inlet passage to define therewith a substantially annular liquid return passage from said quiescent liquid-collecting zone to the air stream at a place immediately adjacent to but posterior to the said marginal edge portion of the inlet passage wall, an upper marginal portion of said generally annular baffle wall structure defining a generally circular side of an upwardly directed air passage from the liquid reservoir to said chamber, a filter element supported by said generally annular baffle wall structure and spanning said upwardly-directed air passage, releasable anchoring means detachably but positively securing the baffle wall structure to the discharge end portion of a wall defining said inlet passage, and releasable anchoring means detachably but positively securing said filter element to said annular baffle wall, said baffle wall structure and filter element being removable through the bottom of the casing as a unit when the displaceable bottom casing section is removed, and said filter being removable from the baffle structure when said unit is removed from the casing.

12. The structure defined in claim 11 in which said filter element comprises a superposed plurality of screens supported by the baffle structure and detachably anchored together and to the baffle structure by the last said anchoring means.

13. In a wet-type air cleaner, spaced generally cylindrical walls defining an outer casing and an annular air intake passage leading downwardly into the lower portion of the casing, and a concentrically located chamber leading upwardly from the lower portion of the casing, a downwardly displaceable cup-like bottom section for the casing defining a liquid reservoir with its lower portion spaced below the discharge end of the inlet passage and wherein air passing from the inlet passage to said chamber reverses its direction around the discharge end of the inlet passage, releasable anchoring means securing the bottom section in operative position, an air outlet passage from the upper portion of the casing above said portion of the casing, a centrally apertured generally annular baffle wall structure concentrically disposed with respect to and adjacent the discharge end of the inlet passage and providing a relatively quiescent liquid-collecting zone thereabove, the lower marginal edge of said baffle wall structure being generally spaced from the marginal edge portion of the inner cylindrical wall defining the inlet passage to define therewith a substantially annular liquid-return passage from the said quiescent liquid-collecting zone thereabove to the air stream at a place immediately adjacent to but posterior of said marginal edge portion of the inlet passage wall, the central aperture of said generally annular baffle wall structure defining a central air passage leading upwardly from the liquid reservoir to said chamber, a filter element supported by said generally annular baffle wall structure and spanning the central aperture of said baffle wall structure which defines the upwardly directed air passage from the reservoir to said chamber, a releasable anchoring means detachably but positively securing the baffle wall structure to the inner generally cylindrical wall defining the annular air intake passage, and releasable anchoring means detachably but positively securing said filter element to said baffle wall structure, said baffle wall structure and filter being removable through the bottom of the casing as a unit when the displaceable bottom casing section is removed, and said filter being removable from the baffle structure when said unit is removed from the casing.

14. The structure defined in claim 13 in which said filter element comprises a superposed plurality of annular screens supported by the baffle structure and detachably anchored together and to the baffle structure by the last said anchoring means.

References Cited in the file of this patent

UNITED STATES PATENTS

| Number | Name | Date |
|---|---|---|
| 2,046,093 | Schaaf et al. | June 30, 1936 |
| 2,251,790 | Hallerberger | Apr. 5, 1941 |
| 2,397,525 | Bennett | Apr. 2, 1946 |
| 2,574,011 | Blair et al. | Nov. 6, 1951 |
| 2,622,695 | Deffanbaugh | Dec. 23, 1952 |